United States Patent
Wang et al.

(10) Patent No.: US 8,206,683 B2
(45) Date of Patent: Jun. 26, 2012

(54) METHOD FOR SYNTHESIZING ALL-SILICA ZEOLITE BETA WITH SMALL CRYSTAL SIZE

(75) Inventors: Yu-Yuan Wang, Taipei (TW);
Chien-Hsun Tsai, Taipei (TW);
Chi-Hsing Tsai, Taipei (TW)

(73) Assignee: Formosan Union Chemical Corp., Taipei (TW)

( * ) Notice: Subject to any disclaimer, the term of this patent is extended or adjusted under 35 U.S.C. 154(b) by 427 days.

(21) Appl. No.: 12/482,899

(22) Filed: Jun. 11, 2009

(65) Prior Publication Data

US 2010/0254894 A1 Oct. 7, 2010

(30) Foreign Application Priority Data

Apr. 1, 2009 (TW) ................................ 98110853 A (51) Int. Cl.
*C01B 39/04* (2006.01)
(52) U.S. Cl. ......................................... 423/705; 423/707
(58) Field of Classification Search .................. 423/707, 423/705
See application file for complete search history.

(56) References Cited

U.S. PATENT DOCUMENTS

| | | | |
|---|---|---|---|
| 3,308,069 A | 3/1967 | Wadlinger et al. | |
| 5,310,534 A | 5/1994 | Fajula et al. | |
| 5,554,356 A | 9/1996 | Saxton et al. | |
| 6,471,941 B1 * | 10/2002 | Boix et al. | 423/707 |
| 6,558,647 B2 * | 5/2003 | Lacombe et al. | 423/702 |
| 6,723,300 B2 * | 4/2004 | Schmitt et al. | 423/705 |
| 7,713,513 B2 * | 5/2010 | Jan et al. | 423/718 |
| 2004/0105814 A1 * | 6/2004 | Rao et al. | 423/705 |
| 2004/0234449 A1 * | 11/2004 | Pasquale et al. | 423/707 |

FOREIGN PATENT DOCUMENTS

| | | |
|---|---|---|
| ES | 2124142 | 1/1999 |
| WO | WO-9733830 | 9/1997 |

OTHER PUBLICATIONS

Serrano et al., "Crystallization mechanism of all-silica zeolite beta in fluoride medium", Microporous and Mesoporous Materials, 200, pp. 35-46, vol. 46.
Camblor et al., "Spontaneous nucleation and growth of pure silica zeolite-βfree of connectivity defects", Chem. Commun., 1996 ,pp. 2365-2366.
Blasco et al., "Unseeded synthesis of Al-free Ti-βzeolite in fluoride medium: a hydrophobic selective oxidation catalyst", Chem. Commun., 1996, pp. 2367-2368.
Camblor et al. "Synthesis in fluoride media and characterization of aluminosilicate zeolite beta", J. Mater. Chem., 1998, pp. 2137-2145, vol. 8—No. 9.

* cited by examiner

*Primary Examiner* — David M Brunsman
(74) *Attorney, Agent, or Firm* — Muncy, Geissler, Olds & Lowe, PLLC (57) ABSTRACT

A method for synthesizing the all-silica zeolite beta with small crystal size is disclosed. This method comprises the steps of: (a) forming a reaction mixture comprising (1) a source of silicon dioxide ($SiO_2$), (2) a source of fluoride ions ($F^-$), (3) a source of tetraethylammonium cations ($TEA^+$), and (4) water ($H_2O$), at predetermined mole ratios of the source of silicon dioxide, the source of fluoride ions, the source of tetraethylammonium cations, and water; (b) crystallizing the reaction mixture; and (c) recovering the crystalline material formed, wherein the pH of the mixture before crystallization has a value of 6 to 9, and the pH of the mixture after crystallization has a value of 6 to 8. This improved method gives a fast and efficient way of synthesis of all-silica zeolite beta with an average crystal size of less than 5 μm.

14 Claims, 6 Drawing Sheets

METHOD FOR SYNTHESIZING ALL-SILICA ZEOLITE BETA WITH SMALL CRYSTAL SIZE

BACKGROUND OF THE INVENTION

1. Field of the Invention

The present invention generally relates to a method for synthesizing zeolite beta, and more particularly to a method for synthesizing all-silica zeolite beta with small crystal size.

2. The Prior Arts

Zeolite beta is synthesized by hydrothermal treatment first described in 1967 in U.S. Pat. No. 3,308,069. Zeolite beta has a three-dimensional large-pore system of a 12-membered ring opening 0.76 nm wide, and draws much attention because of its relative high thermal stability, unique characteristics, in particular its acidity and potential for acid catalysis. According to literature, zeolite beta possesses high activity in cracking, isomerization, cyclization, alkylation, and hydrocracking of the alkanes, and plays an important role in the petroleum industry.

When zeolite beta with high surface area and large pore volume is used as a heterogeneous catalyst, it can exhibit high reactivity and selectivity in the acid catalyzed reactions. The heterogeneous catalytic reaction involves adsorption, diffusion, chemical reaction and desorption steps. The heterogeneous catalytic reaction occurs at or very near the fluid-solid interface, and thereby catalytic performance can be improved by increasing geometric surface area. The smaller the particle size is, the higher the surface area is. When the surface area of the catalyst is higher, it has more catalytic active sites, and thereby the catalytic performance becomes better. Also, research has been focused recently on the development of new methods for preparation of highly silicious zeolites exhibiting extremely low acidity, such as high-silica zeolites, and all-silica zeolites. Therefore, it is desirable to find an economic and efficient way to reach these goals.

Zeolite beta was synthesized by hydrolyzing an aqueous solution of a synthetic mixture comprising a silica source (such as tetraalkyl orthosilicate, $Si(OR)_4$) and an aluminium source in the presence of a templating agent, nucleating the resulting product under stirring at room temperature (15 to 30° C.), followed by crystallization at higher temperatures and pressures, and finally drying the resulting product. In the above process, the hydrolysis product of $Si(OR)_4$ with water contains a certain amount of silanol Si—OH groups, and these silanol Si—OH groups tend to condense by creating Si—O—Si bonds. When $Si(OR)_4$ was hydrolyzed at room temperature, the hydrolysis process took very long time to complete. Since the hydrolysis went on exceedingly slowly, an acid or alkaline catalyst (such as tetraethylammonium hydroxide) was usually added to accelerate the hydrolysis process.

Reference is made to U.S. Pat. No. 5,310,534, wherein the synthesis method of highly silicious zeolite beta with silica-to-alumina ratio of more than 4000 was described, and in which dealuminization was achieved by acid treatment. The drawbacks are that the highly silicious zeolite beta was obtained with only 80% crystallinity due to the presence of considerable defects in its crystalline structure. Reference is also made to U.S. Pat. No. 5,554,356, wherein all-silica zeolite beta was synthesized using 4,4'-trimethylenebis(N-benzylpiperidine) as an organic template. The drawbacks are that this synthesis method is not easily commercialized because 4,4'-trimethylenebis(N-benzylpiperidine) is not commercially cheap available. Reference is made to WO97/33830 and D. P. Serrano et al. in "Crystallization mechanism of all-silica zeolite beta in fluoride medium", published in Microporous and Mesoporous Materials, 46, pp. 35-46, 2001, wherein all-silica zeolite beta was synthesized using tetraethyl orthosilicate as a source of silicon dioxide, and tetraethylammonium hydroxide as an organic template, in the presence of fluoride ions. The drawbacks are that all-silica zeolite beta with a broad crystal size distribution is obtained, and most of its crystal sizes are larger than 10 μm. Also, the synthesis method disclosed by WO97/33830 and D. P. Serrano et al. only suitably applied in small-scale production. If all-silica zeolite beta is produced in large scale quantities by the method disclosed by WO97/33830 and D. P. Serrano et al., the crystallinity of all-silica zeolite beta obtained will become non-uniform and become very lower than the original product. However, when the all-silica zeolite beta is prepared according to the same methods as disclosed by WO97/33830 and D. P. Serrano et al except for using the source of silicon dioxide other than tetraethyl orthosilicate, it shows that the aging process takes about seven or more days for growing high quality crystals.

Reference is made to Camblor et al, Chem. Commun., 2365, 1996, wherein zeolite beta could be successfully synthesized via the fluoride route in absence of aluminum or titanium. Camblor et al. found that fluoride ions reside within the small cage located around the periphery of the central pore space of zeolite beta, showing some "templating" role for the formation of zeolite beta crystals. However, in the method disclosed by Camblor et al., the aging process was carried out at room temperature, and thereby there may be a problem with ethanol left in the hydrolysis product, which will hinder the crystallization of all-silica zeolite beta. Consequently, the overall synthesis time becomes long for growing high quality crystals when using the method disclosed by Camblor et al.

Reference is made to Spain Pat. No. P9501552, wherein zeolite beta with a high silica-to-alumina mole ratio was synthesized using Al-containing zeolite beta as seed. The overall synthesis time was shortened due to the presence of $Al_2O_3$.

In the prior art, zeolite beta was typically synthesized using tetraethyl orthosilicate as a source of silicon dioxide, which was easily hydrolized. However, the disadvantages for using tetraethyl orthosilicate are that tetraethyl orthosilicate is toxic, its purchase price is high, the evaporation of ethanol is incomplete after aging, and zeolite beta product is obtained in low yield. However, although a method for synthesizing zeolite beta using colloidal silica or fumed silica has been reported in several literatures, the overall synthesis time reported in these literatures usually was 15 or more days, and also zeolite beta with large crystal size was obtained.

As stated above, zeolite beta with small crystal size is the most desired catalyst for heterogeneous catalytic reactions due to its increased active acidic sites and increased three dimensional interface with the support and reactant. Therefore, for most industrial purposes, the demand is that zeolite beta has a smaller and more uniform crystal size.

According to the above, in order to solve the drawbacks of prior art, the present invention gives a fast and efficient way of synthesis of all-silica zeolite beta with small crystal size.

SUMMARY OF THE INVENTION

The objective of the present invention is to provide a method for synthesizing all-silica zeolite beta with small crystal size. By the method of the present invention, the all-silica zeolite beta with an average crystal size of less than 5 μm (some even reach 0.5 μm) can be obtained within one to four days, compared to ten or more days required in the conventional method.

To achieve the foregoing objective, the present invention provides a method for synthesizing an all-silica zeolite beta with small crystal size, comprising the following steps: (a) forming a reaction mixture comprising (1) a source of silicon dioxide ($SiO_2$), (2) a source of fluoride ions ($F^-$), (3) a source of tetraethylammonium cations ($TEA^+$), and (4) water ($H_2O$), the reaction mixture having a composition expressed in terms of mole ratios in the following ranges:

$F^-/SiO_2$=0.33 to 3.0

$TEA^+/SiO_2$=0.3 to 1.0

$H_2O/SiO_2$=1.5 to 6.0

$F^-/TEA^+$=1.1 to 3.0

(b) maintaining the reaction mixture under conditions sufficient to form crystals of the all-silica zeolite beta; and (c) recovering the crystals of the all-silica zeolite beta, wherein the pH of the mixture before crystallization is in the range from 6 to 9, and the pH of the mixture after completion of crystallization is in the range from 6 to 8.

The method for synthesizing the all-silica zeolite beta of the present invention can further comprises the step of calcining the crystals of all-silica zeolite beta to remove the organic template after the step (c).

The advantage of the present invention is that: it provides a rapid and efficient method to synthesize highly crystalline all-silica zeolite beta with an average crystal size of less than 5 μm within one to four days, as compared to the conventional method where the all-silica zeolite beta has an average crystal size of larger than 10 μm, and the overall synthesis time for all-silica zeolite beta is ten or more days. Also, according to the present invention, the highly crystalline all-silica zeolite beta with small crystal size can be produced in large scale for practical application.

The foregoing and other objectives, features, aspects and advantages of the present invention will become better understood from a careful reading of a detailed description provided herein below.

DETAILED DESCRIPTION OF THE PREFERRED EMBODIMENTS

The all-silica zeolite beta of the present invention is synthesized by a method, comprising the following steps: (a) preparing a reaction mixture comprising a source of silicon dioxide ($SiO_2$), a source of fluoride ions ($F^-$), a source of tetraethylammonium cations ($TEA^+$) as an organic template, and deionized water ($H_2O$), wherein the reaction mixture, i.e. gel composition, has a composition expressed in terms of mole ratios in the following ranges:

$F^-/SiO_2$=0.33 to 3.0

$TEA^+/SiO_2$=0.3 to 1.0

$H_2O/SiO_2$=1.5 to 6.0

$F^-/TEA^+$=1.1 to 3.0

(b) crystallizing the reaction mixture to obtain all-silica zeolite beta; (c) recovering the all-silica zeolite beta; and (d) calcining the crystals of all-silica zeolite beta in air at 350 to 900° C. for 7 to 9 hours in order to remove the organic template, wherein the pH of the mixture before crystallization is in the range from 6 to 9, and the pH of the mixture after completion of crystallization is in the range from 6 to 8. When the all-silica zeolite beta after calcination is soaked in neutral water (pH=7.0), the pH of water becomes acidic (pH<4.0). In the present invention, the crystals of the all-silica zeolite beta obtained have an average crystal size of less than 5 μm.

However, when the mole ratio of $TEA^+$ to $SiO_2$ is less tan 0.50, the mole ratio of $F^-$ to $SiO_2$ is preferably in the range of 0.55 to 3.0.

In one embodiment according to the present invention, in the above step (a), the source of silicon dioxide ($SiO_2$), the source of fluoride ions ($F^-$), and deionized water ($H_2O$) are first mixed together at room temperature, and then mixed with the source of tetraethylammonium cations ($TEA^+$) at a temperature of 40 to 80° C. to form the reaction mixture, the reaction mixture has a composition expressed in terms of mole ratios in the following ranges:

$F^-/SiO_2$=0.44 to 1.8

$TEA^+/SiO_2$=0.4 to 0.9

$H_2O/SiO_2$=1.5 to 4.0

$F^-/TEA^+$=1.1 to 2.0.

In another embodiment according to the present invention, in the above step (a), the source of silicon dioxide ($SiO_2$), the source of tetraethylammonium cations ($TEA^+$), and water ($H_2O$) are first mixed together at a temperature of 40 to 80° C., and then mixed with the source of fluoride ions ($F^-$) at a temperature of 40 to 80° C. to form the reaction mixture, the reaction mixture has a composition expressed in terms of mole ratios in the following ranges:

$F^-/SiO_2$=0.55 to 2.0

$TEA^+/SiO_2$=0.5 to 1.0

$H_2O/SiO_2$=2.0 to 4.0

$F^-/TEA^+$=1.1 to 2.0.

The order for mixing of the source of tetraethylammonium cations ($TEA^+$) and the source of fluoride ions ($F^-$) with other components is not particularly limited, but it is preferable to add the source of fluoride ions ($F^-$) first to the solution containing the source of silicon dioxide.

The key factors on rapid and efficient synthesis of the all-silica zeolite beta with small crystal size in the present invention include: the amount of water used, the composition mole ratios, the aging temperature, the stirring speed of revolution, the timing control, and the initial and final pH of the system.

The transformation of sol to gel takes place via hydrolysis and condensation reactions of the silica precursors. Water plays an important role in both hydrolysis and condensation processes. In the hydrolysis process, water acts both as a reactant and as a solvent. The hydrolysis rate of silica precursors increases as the amount of water used increases. However, the condensation of silica precursors becomes unfavorable when excess water is used. The reason for that is that excess water can dilute the concentration of silica precursors in aqueous solution, which lead to the increase of gelling time. In the prior art, it only paid attention to the evaporation off of ethanol produced upon hydrolysis of silica alkoxides without considering the important role of water. However, water plays an important role in the sol-gel synthesis of zeolites. When excess amount of water is used, the hydrolysis of silica alkoxides will be close to completion, but ethanol can not evaporate completely, which will hinder the crystallization of all-silica zeolite beta. As a result, when using excess amount of water in the hydrolysis, the crystallization time for zeolite beta was usually ten to twenty days, and in some cases, the crystals of zeolite beta even did not grow. Also, when a large amount of water is used, the hydrolysis of silica alkoxides will be close to completion, and thereby a lot of —OH groups of $(HO)_n$—Si $(OR)_{4-n}$ will be produced. Consequently, the unreacted —OH groups will continuously involve in the condensation during the subsequent heating processes, and thereby the zeolite beta produced will have large crystal size.

Generally, if the mole ratio of $H_2O$ to $SiO_2$ is less than 7.0, the crystal size of all-silica zeolite beta produced will be less than 10 μm; if the mole ratio of $H_2O$ to $SiO_2$ is less than 6.0, the crystal size of all-silica zeolite beta produced will be less than 5 μm; if the mole ratio of $H_2O$ to $SiO_2$ is less than 5.0, the crystal size of all-silica zeolite beta produced will be less than 3 μm; and if the mole ratio of $H_2O$ to $SiO_2$ is less than 4.0, the crystal size of all-silica zeolite beta produced will be less than 1 μm.

Fluoride ions (from HF, for example) are extremely important in involving the synthesis of all-silica zeolite beta. In the prior art, the mole ratio of $TEA^+$ to $F^-$ used in the synthesis of all-silica zeolite beta is always 1:1. However, the inventors of the present invention found that if the mole ratio of $F^-$ to $TEA^+$ is more than 1, the all-silica zeolite beta with small crystal size can be synthesized in a short period of time. That is, when an excess amount of hydrofluoric acid is used, all-silica zeolite beta with smaller crystal size can be produced in a reduced time, as compared to using equal mole of $TEA^+$ and $F^-$.

When the crystallization of the all-silica zeolite beta is carried out in static conditions, the all-silica zeolite beta will be synthesized in a short period of time if the mole ratio of TEAOH to $SiO_2$ is more than 0.54. However, when the crystallization of the all-silica zeolite beta is carried out under stirring, the all-silica zeolite beta will be synthesized in a short period of time if the mole ratio of TEAOH to $SiO_2$ is from 0.3 to 0.5 and the mole ratio of HF to $SiO_2$ is more than 0.7. That means when the less amount of TEAOH is used, the more amount of HF will need to be used.

In order to form the all-silica zeolite beta with small crystal size, the source of silicon dioxide and HF are preferably first mixed together, aged for an appropriate time, and then mixed with tetraethylammonium hydroxide.

The aging temperature is 30 to 90° C., preferably 40 to 80° C. However, when tetraethyl orthosilicate is used as a source of silicon dioxide, the aging temperature is better not over 40° C. due to volatilization of tetraethyl orthosilicate at a temperature above 40° C. In the prior art (for example, the patents of Corma et al.), tetraethyl orthosilicate is used as a source of silicon dioxide, and thereby there is a problem with ethanol left in the products, which will hinder the crystallization of all-silica zeolite beta. As a result, the overall synthesis time becomes longer.

In the above step (a), in order to promote crystallization, it may be favorable to add zeolite beta, zeolite mordenite, or metal salt to the reaction mixture.

In the above step (b), the crystallization is carried out at a temperature of 100 to 190° C., preferably 40 to 180° C. under stirring at 0 to 800 rpm, preferably 300 to 600 rpm. When the crystallization was carried out under stirring at 60 rpm as shown in the patents of Corma et al., the crystal size of all-silica zeolite beta could not be further reduced, and the crystal size distribution of all-silica zeolite beta was rather broad. However, when the crystallization was carried out under stirring at 300 to 600 rpm, the crystal size of all-silica zeolite beta can be further reduced, and the crystal size distribution of all-silica zeolite beta is rather narrow.

Examples of the sources of silicon oxide useful in the present invention include tetraalkyl orthosilicates, colloidal silica, fumed silica, silicic acid, and amorphous silica. Most preferably, colloidal silica or fumed silica is employed as the source of silicon oxide. The cheap colloidal silica and fumed silica are not easily hydrolyzed, but the problem of hydrolysis can be overcome in the present invention. The crystalline all-silica zeolite beta with small crystal size can be synthesized within one to four days in the present invention.

In the embodiment of the present invention, the same procedure was followed as in the patents of Corma et al. except that fumed silica was used instead of tetraethyl orthosilicate. However, there were no detectable levels of zeolite beta in the solid product after 22 days of synthesis, and the quartz instead of zeolite beta was obtained after 30 days of synthesis. Therefore, it was proven that tetraethyl orthosilicate, which was easily hydrolized, was most preferably used as the sources of silicon oxide sources of silicon oxide when the procedure disclosed by the patents of Corma et al. was followed.

An example of the source of fluoride ions useful in the present invention is hydrofluoric acid.

The pH of the system greatly affect the formation of crystalline zeolite beta prepared by the sol-gel process, and it not only greatly affect the crystal morphology, optical properties, and the crystal sizes, but also greatly influence the reaction rate. In an acidic system, the zeolite beta is formed with small crystal size because the hydrolysis rate for siloxaneis is fast and the condensation rate for its hydrolysis product is slow. In an alkaline system, the zeolite beta is formed with large crystal size because the hydrolysis rate for siloxaneis is slow and the condensation rate for its hydrolysis product is fast, and also the solubility of silica increases under alkaline condition. In the present invention, the pH of the mixture before crystallization is in the range from 6 to 9, and the pH of the mixture after completion of crystallization is in the range from 6 to 8. Furthermore, in the present invention, if the all-silica zeolite beta after calcination is soaked in neutral water, the water will become acidic with pH value less than 4.0. On the other hand, in the present invention, when the solid product obtained after crystallization is separated from the remaining liquid by centrifugation, the supernatant liquid will have a pH of 8 to 9, and the bottom liquid with the solid product will have a pH of 6 to 7.

The all-silica zeolite beta produced by the method of the present invention can be used for manufacturing zeolite membranes, or used for manufacturing zeolite beta based catalysts which shows enhanced activity for the hydrogenation of unsaturated or functionalized hydrocarbons, the dehydrogenation of hydrocarbons, the oxidation of hydrocarbons, the mild hydrocracking of hydrocarbons or functionalized hydrocarbons, or the polymerization of olefins.

The invention will now be described in more detail, though only by way of illustration, in the following examples and evaluations.

COMPARATIVE EXAMPLE 1 to COMPARATIVE EXAMPLE 3 illustrate the synthesis of the all-silica zeolite beta, which was carried out following a modification of the method given by D. P. Serrano et al. in "Crystallization mechanism of all-silica zeolite beta in fluoride medium", published in Microporous and Mesoporous Materials, 46, pp. 35-46, 2001.

Comparative Example 1

A 41.67 g quantity of tetraethyl orthosilicate (TEOS, 98% of purity, Alfa), 46.28 g of tetraethylammonium hydroxide (TEAH, 35 wt %, aqueous solution, Aldrich, Na<2 ppm, and K<0.5 ppm), and adequate amount of water were mixed in a polypropylene beaker under stirring at 30° C. for 72 hours. Thereafter, 3.45 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=7.6$ $F^-/SiO_2=0.6$

This white solid-like gel was then transferred into a Teflon bottle held in a stainless-steel autoclave for crystallization. The crystallization was carried out in static conditions at 140° C., and time for crystallization was seven and a half days. The solid product obtained after crystallization was separated from the remaining light brown liquid (the supernatant liquid had a pH of 8 to 9, and the bottom liquid with the solid product had a pH of 6 to 7) by centrifugation, washed several times with distilled water, and dried under vacuum at 120° C. Thereafter, the as-synthesized solid product was calcined in static air at 550° C. for 8 hours.

Figure 1:
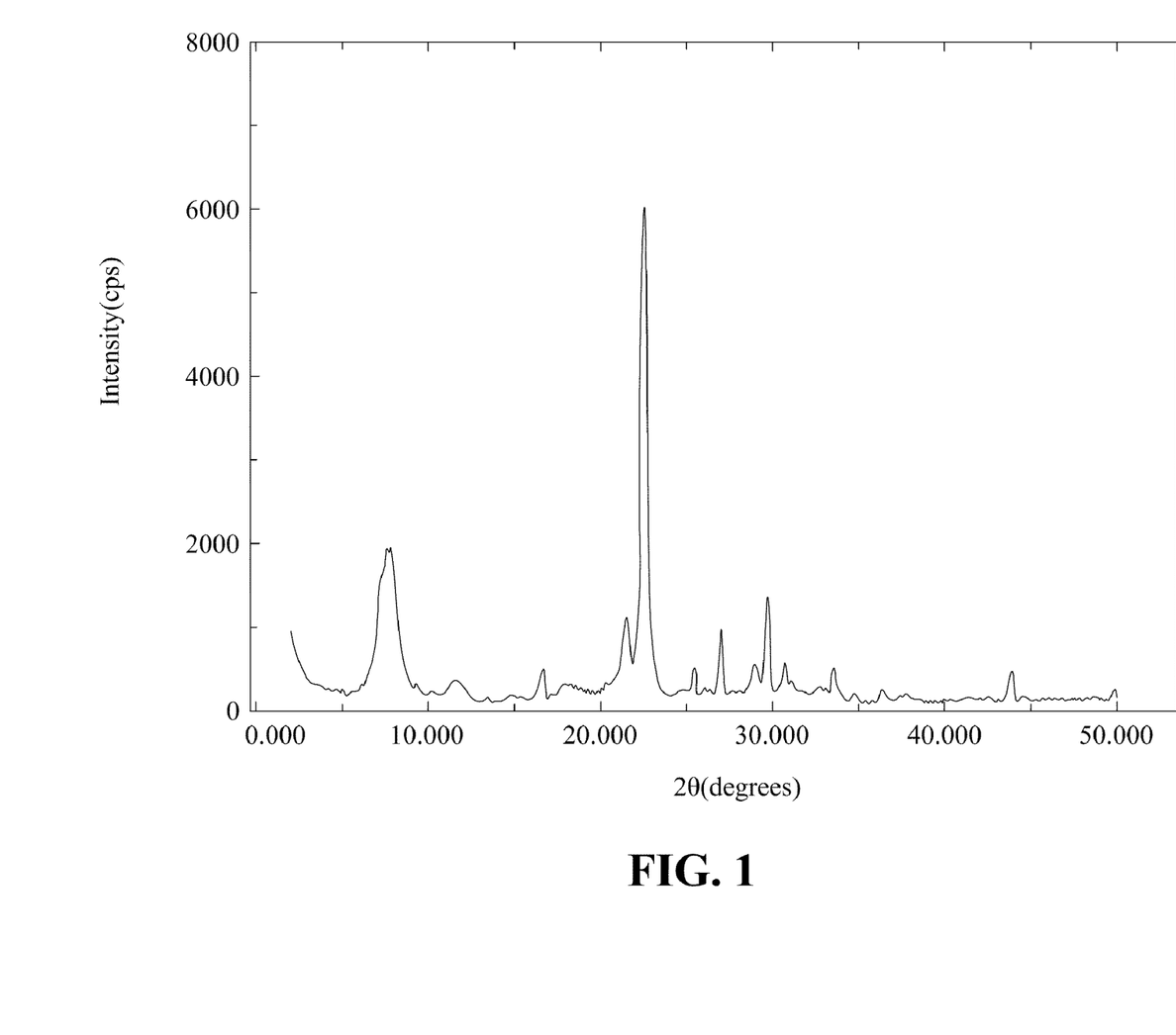
FIG. 1 shows the XRD pattern of the as-synthesized all-silica zeolite beta formed in Comparative Example 1.
Figure 2:
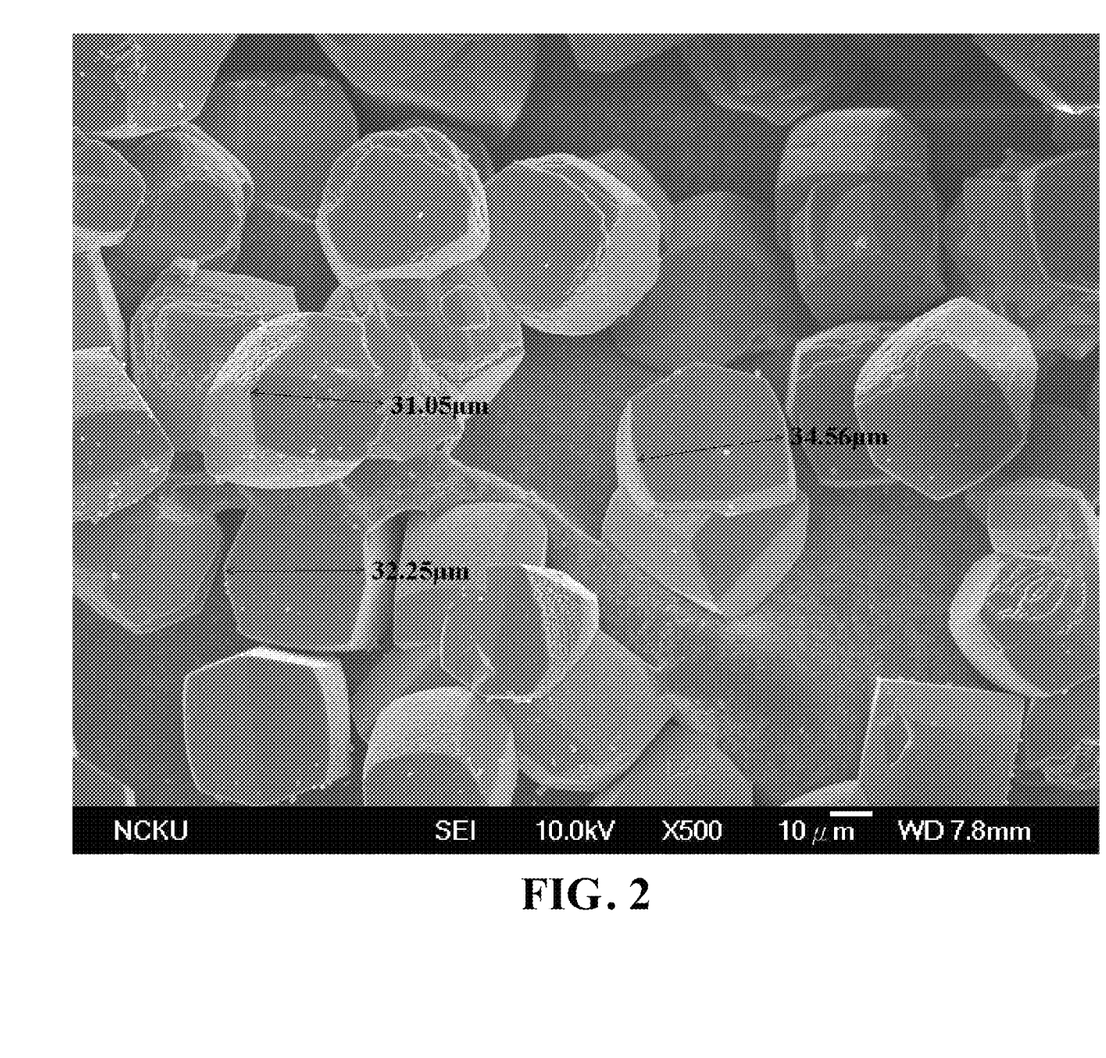
FIG. 2 shows the SEM micrograph of all-silica zeolite beta formed in Comparative Example 1.

The solid product once calcined was characterized using X-ray diffractometer (XRD) and scanning electron microscope (SEM). The crystallinity of the solid product was determined by X-ray powder diffraction. In FIG. 1, it found that the most intense peak of diffraction emerged at diffraction angle 2θ of 22.5°, which is typical of the BEA topology, and the intensity of the most intense peak of diffraction of the solid product obtained in this example has been taken as standard (i.e. the crystallinity of all-silica zeolite beta as solid product was assumed to be 100%.) for calculating the relative crystallinities of the remaining solid products obtained in the following examples. FIG. 2 shows SEM micrograph of highly crystalline all-silica zeolite beta obtained after the solid product was calcined at 550° C. for 8 h. The crystal sizes of all-silica zeolite beta determined from the SEM micrographs were ranged from 20 to 30 μm.

Comparative Example 2

The procedure of this example is similar to the procedure of COMPARATIVE EXAMPLE 1 except that the fumed silica was used instead of tetraethyl orthosilicate, and the mole ratios of the composition of the white solid-like gel were shown as below.

A 6.12 g quantity of fumed silica (crystal size=0.0007 μm, surface area=390 m²/g, Sigma), 22.74 g of tetraethylammonium hydroxide (TEAH, 35 wt %, aqueous solution, Aldrich), and 7.08 g of deionized water were mixed in a polypropylene beaker under stirring at 30° C. for one day. Thereafter, 2.27 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.53$ $H_2O/SiO_2=10.6$ $F^-/SiO_2=0.53$

This white solid-like gel was then transferred into a Teflon bottle held in a stainless-steel autoclave for crystallization. The crystallization was carried out in static conditions at 140° C., and time for crystallization was 9 to 22 days (the samples were taken for several times during this period). The solid product obtained after crystallization was filtered, dried, and calcined at 550° C. for 8 hours.

The solid product once calcined was characterized using XRD analysis, and it was shown that there were no detectable levels of zeolite beta in the solid product.

Comparative Example 3

The procedure of this example is similar to the procedure of COMPARATIVE EXAMPLE 1 except that silicic acid was used instead of tetraethyl orthosilicate, and the mole ratios of the composition of the white solid-like gel were shown as below.

A 19.81 g quantity of silicic acid (Aldrich), 76.09 g of tetraethylammonium hydroxide (TEAH, 35 wt %, aqueous solution, Aldrich), and adequate amount of water were mixed in a polypropylene beaker under refluxing at 40° C. for three days. Thereafter, 6.36 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=9.09$ $F^-/SiO_2=0.46$

This white solid-like gel was then transferred into a Teflon bottle held in a stainless-steel autoclave for crystallization. The crystallization was carried out in static conditions at 140° C., and time for crystallization was 10 days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 84% (i.e. the ratio of the intensity of the most intense XRD peak (located at 2 θ=22.5°) of the solid product obtained in this example to the intensity of the most intense XRD peak (located at 2 θ=22.5°) of the solid product obtained in COMPARATIVE EXAMPLE 1. SEM micrograph showed that crystalline all-silica zeolite beta obtained had truncated square bipyramidal morphology with some amorphous phases, which indicated the incompletion of the reaction, and the crystal sizes of all-silica zeolite beta were around 20 μm or less.

COMPARATIVE EXAMPLE 4 and COMPARATIVE EXAMPLE 5 illustrate the synthesis of the all-silica zeolite beta, which was carried out following a modification of the method given by Corma et al. in WO 97/33830.

Comparative Example 4

The procedure of the synthesis of the all-silica zeolite beta according to the disclosure of Corma et al. in WO 97/33830 (Example 8) was followed except that colloidal silica was used instead of tetraethyl orthosilicate, and the aging time was longer.

A 74.4 g quantity of colloidal silica (40 wt %, LudoxAS-40), 115.4 g of tetraethylammonium hydroxide (35%, Aldrich), and adequate amount of water were mixed in a polypropylene beaker under stirring at 32° C. for 7 days. Thereafter, 11.95 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=7.2$ $F^-/SiO_2=0.55$

This white solid-like gel was then transferred into a Teflon bottle held in a stainless-steel autoclave for crystallization. The crystallization was carried out at 140° C. while stirring at 60 rpm, and time for crystallization was 3 days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 84%. SEM micrograph showed that the crystal size distribution of all-silica zeolite beta was rather broad, and the crystal sizes of all-silica zeolite beta were around 10 μm.

Comparative Example 5

The procedure of the synthesis of the all-silica zeolite beta according to the disclosure of Corma et al. in WO 97/33830 (Example 8) was followed except that the aging time was longer.

A 81.8 g quantity of tetraethyl orthosilicate (98%), 88.6 g of tetraethylammonium hydroxide (35%, Aldrich), and adequate amount of water were mixed in a polypropylene beaker under stirring at 30° C. for 68 hours. Thereafter, 8.85 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.547$ $H_2O/SiO_2=5.59$ $F^-/SiO_2=0.552$

This white solid-like gel was then transferred into a Teflon bottle held in a stainless-steel autoclave for crystallization. The crystallization was carried out at 140° C. while stirring at 60 rpm, and time for crystallization was 70 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 89%. SEM micrograph showed that the crystal size distribution of all-silica zeolite beta was rather broad, and the crystal sizes of all-silica zeolite beta were ranged from 10 to 20 μm.

The following EXAMPLE 1 to EXAMPLE 13 illustrate the preferred embodiments of the invention, in which the source of silicon dioxide, tetraethylammonium hydroxide, and water were first mixed together, and then mixed with hydrofluoric acid, in the absence of $Al_2O_3$.

Example 1

A 51.6 g quantity of colloidal silica (30 wt %, Ludox AS-30), 58.95 g of tetraethylammonium hydroxide (35 wt %, aqueous solution, Aldrich), and adequate amount of water were mixed in a polypropylene beaker under stirring at 45° C. for 24 hours. Thereafter, 7.0 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.54$ $H_2O/SiO_2=4.6$ $F^-/SiO_2=0.65$

This white solid-like gel was then transferred into a Teflon bottle held in a stainless-steel autoclave for crystallization. The crystallization was carried out in static conditions at 160° C., and time for crystallization was 23 hours. The solid product obtained after crystallization was separated from the remaining liquid by centrifugation, washed several times with distilled water, and dried under vacuum at 120° C. Thereafter, the as-synthesized solid product was calcined in static air at 550° C. for 8 hours. Finally, 14.45 g of all-silica zeolite beta as solid product was obtained, and the yield of all-silica zeolite beta was 90%.

Figure 3:
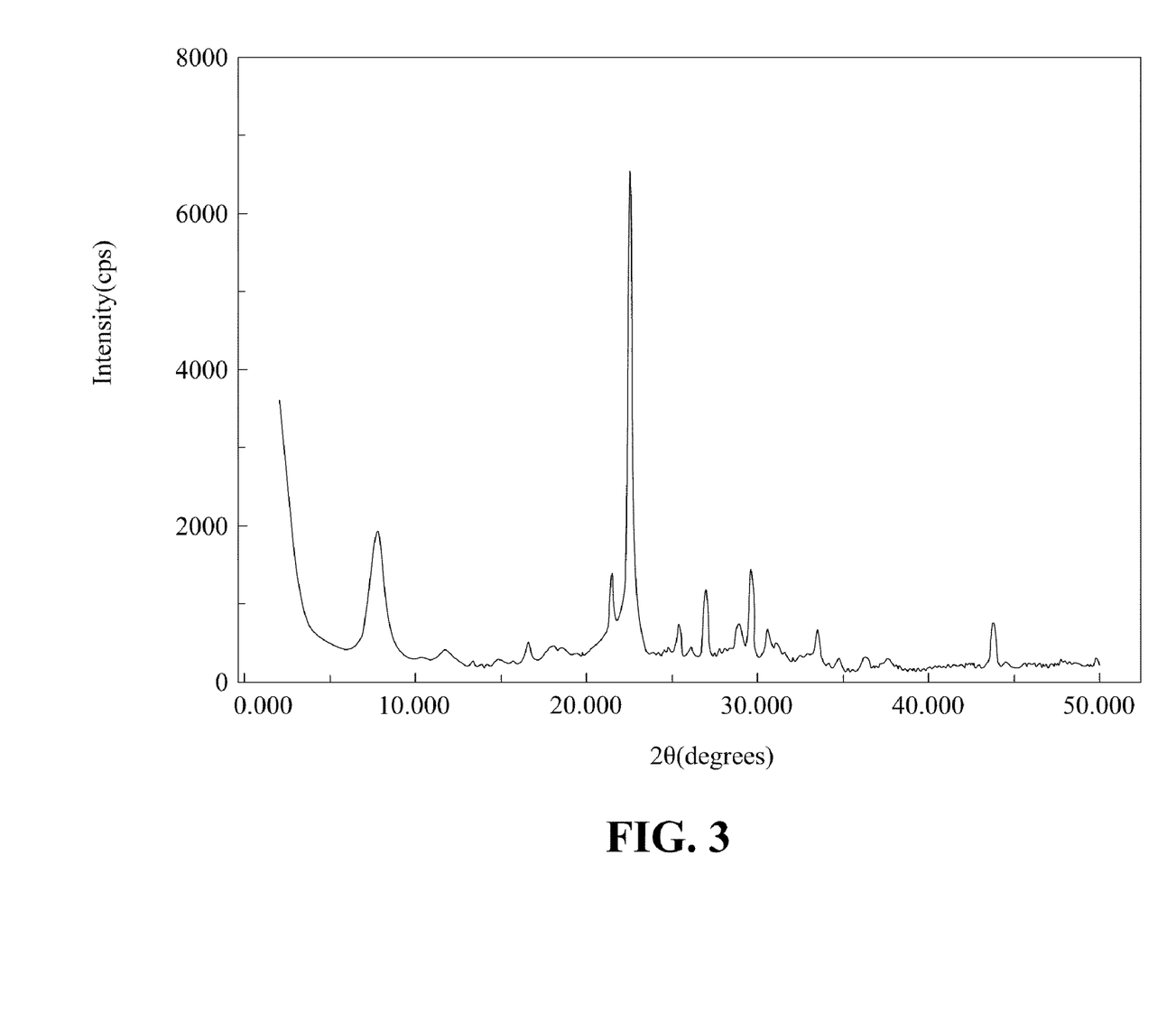
FIG. 3 shows the XRD pattern of the as-synthesized all-silica zeolite beta formed in Example 1.
Figure 4:
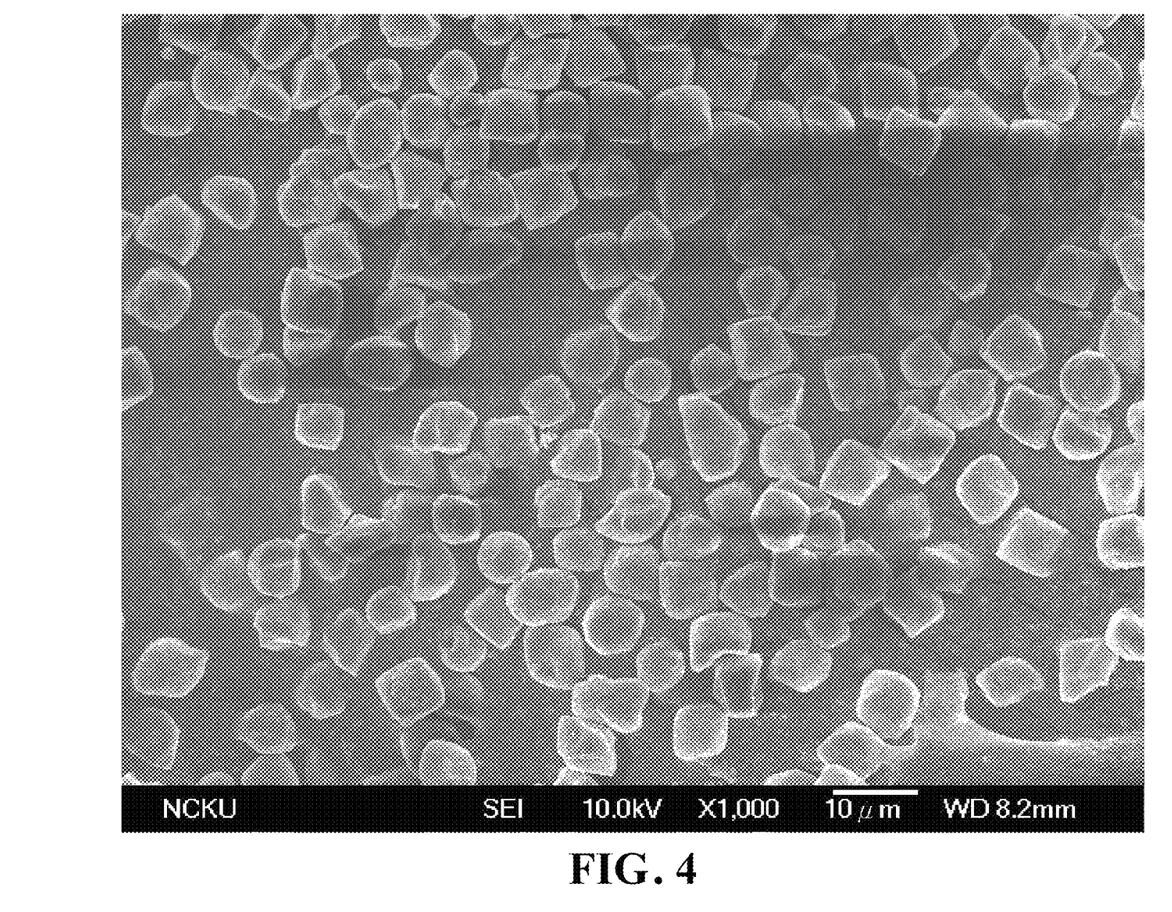
FIG. 4 shows the SEM micrograph of all-silica zeolite beta formed in Example 1.

The solid product once calcined was characterized using XRD and SEM analyses. The crystallinity of all-silica zeolite beta as solid product was determined by X-ray powder diffraction (see FIG. 3), and it found that the relative crystallinity of all-silica zeolite beta was 100% (i.e. the ratio of the intensity of the most intense XRD peak (located at 2 θ=22.5°) of the solid product obtained in this example to the intensity of the most intense XRD peak (located at 2 θ=22.5°) of the solid product obtained in COMPARATIVE EXAMPLE 1). SEM micrograph (see FIG. 4) showed that crystalline all-silica zeolite beta obtained had an average crystal size of about 5 μm, had a narrow crystal size distribution, and had truncated square bipyramidal morphology.

Example 2

A 15.74 g quantity of silicic acid (Sigma), 47.37 g of tetraethylammonium hydroxide (35 wt %, aqueous solution, Aldrich), and adequate amount of water were mixed in a polypropylene beaker under stirring at 40° C. for three days. Thereafter, 5.8 g of hydrofluoric acid (48 wt %, aqueous solution, Panreac) was dropwise added to the resulting mixture under stirring, which caused the transformation of the mixture into a white solid-like gel. The white solid-like gel, i.e. reaction mixture, had a composition expressed in terms of mole ratios within the ranges as follows:

$SiO_2/Al_2O_3=\infty$ $TEA^+/SiO_2=0.56$ $H_2O/SiO_2=4.6$ $F^-/SiO_2=0.69$

This white solid-like gel was then transferred into a Teflon bottle held in a stainless-steel autoclave for crystallization. The crystallization was carried out in static conditions at 140° C., and time for crystallization was four and a half days. The solid product obtained after crystallization was separated from the remaining light brown liquid (the supernatant liquid had a pH of 8 to 9, and the bottom liquid with the solid product had a pH of 6 to 7) by centrifugation, washed several times with distilled water, and dried under vacuum at 120° C. Thereafter, the as-synthesized solid product was calcined in static air at 550° C. for 8 hours. Finally, 12.33 g of all-silica zeolite beta as solid product was obtained, and the yield of all-silica zeolite beta was 78.33%.

The solid product once calcined was characterized using XRD and SEM analyses. The crystallinity of all-silica zeolite beta as solid product was determined by X-ray powder diffraction, and it found that the relative crystallinity of all-silica zeolite beta was 87%. SEM micrograph showed that crystalline all-silica zeolite beta obtained had an average crystal size of about 5 μm, had a narrow crystal size distribution, and had truncated square bipyramidal morphology.

Example 3

A 40.8 g quantity of colloidal silica (30 wt %, Ludox AS-30), 46.85 g of tetraethylammonium hydroxide (35 wt %, aqueous solution, Aldrich), and adequate amount of water were mixed in a polypropylene beaker under stirring at 50° C. for 48 hours. Thereafter, 9.0 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=3.2$ $F^-/SiO_2=0.60$

This white solid-like gel was then transferred into a Teflon bottle held in a stainless-steel autoclave for crystallization. The crystallization was carried out in static conditions at 140° C., and time for crystallization was four and a half days. The solid product obtained after crystallization was separated from the remaining liquid by centrifugation, washed several times with distilled water, and dried under vacuum at 120° C. Thereafter, the as-synthesized solid product was calcined in static air at 550° C. for 8 hours. Finally, 11.08 g of all-silica zeolite beta as solid product was obtained, and the yield of all-silica zeolite beta was 88%.

The solid product once calcined was characterized using XRD and SEM analyses. The crystallinity of all-silica zeolite beta as solid product was determined by X-ray powder diffraction, and it found that the relative crystallinity of all-silica zeolite beta was 108%. SEM micrograph showed that crystalline all-silica zeolite beta obtained had an average crystal size of about 3 μm, had a narrow crystal size distribution, and had truncated square bipyramidal morphology.

Example 4

A 30 g quantity of colloidal silica (40 wt %, Ludox AS-40), 49.3 g of tetraethylammonium hydroxide (35 wt %, aqueous solution, Aldrich), and adequate amount of water were mixed in a polypropylene beaker under stirring at 90° C. for 12 hours. Thereafter, 5.0 g of hydrofluoric acid (48 wt %, aqueous solution, Panreac) was dropwise added to the resulting mixture under stirring, which caused the transformation of the mixture into a brown solid-like gel. The brown solid-like gel had a composition expressed in terms of mole ratios within the ranges as follows:

$SiO_2/Al_2O_3=\infty$ $TEA^+/SiO_2=0.58$ $H_2O/SiO_2=2.6$ $F^-/SiO_2=0.60$

This brown solid-like gel was then transferred into a Teflon bottle held in a stainless-steel autoclave for crystallization. The crystallization was carried out in static conditions at 140° C., and time for crystallization was 3 days. The solid product obtained after crystallization was filtered, dried, and calcined at 550° C. for 8 hours.

The solid product once calcined was characterized using XRD analysis, and it was shown that no crystals were detected within the sample taken. Therefore, when the aging temperature is too high, the crystals are not easily formed.

Example 5

A 50 g quantity of colloidal silica (30 wt %, Ludox AS-30), 57.85 g of tetraethylammonium hydroxide (35 wt %, aqueous solution, Aldrich), and adequate amount of water were mixed in a polypropylene beaker under stirring at 40° C. for 24 hours. Thereafter, 7.3 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.56$ $H_2O/SiO_2=4.2$ $F^-/SiO_2=0.70$

This white solid-like gel was then transferred into a Teflon bottle held in a stainless-steel autoclave for crystallization. The crystallization was carried out in static conditions at 140° C., and time for crystallization was 43 hours. The solid product obtained after crystallization was separated from the remaining liquid by centrifugation, washed several times with distilled water, and dried under vacuum at 120° C. Thereafter, the as-synthesized solid product was calcined in static air at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 83%. SEM micrograph showed that crystalline all-silica zeolite beta obtained had an average crystal size of about 5 µm, had a narrow crystal size distribution, and had truncated square bipyramidal morphology.

Example 6

A 61.1 g quantity of colloidal silica (30 wt %, Ludox AS-30), 69.95 g of tetraethylammonium hydroxide (35 wt %, aqueous solution, Aldrich), and adequate amount of water were mixed in a polypropylene beaker under stirring at 40° C. for 24 hours. Thereafter, 9.0 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.54$ $H_2O/SiO_2=4.2$ $F^-/SiO_2=0.71$

This white solid-like gel was then transferred into a Teflon bottle held in a stainless-steel autoclave for crystallization. The crystallization was carried out in static conditions at 180° C., and time for crystallization was 16 hours. The solid product obtained after crystallization was separated from the remaining liquid by centrifugation, washed several times with distilled water, and dried under vacuum at 120° C. Thereafter, the as-synthesized solid product was calcined in static air at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 107%. SEM micrograph showed that crystalline all-silica zeolite beta obtained had an average crystal size of about 5 µm, had a narrow crystal size distribution, and had truncated square bipyramidal morphology.

Example 7

A 15 g quantity of fumed silica (Sigma), 58.05 g of tetraethylammonium hydroxide (35 wt %, aqueous solution, Aldrich), and 50 g of deionized water were mixed in a polypropylene beaker under stirring at 45° C. for 24 hours. Thereafter, 9.0 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=3.6$ $F^-/SiO_2=0.61$

This white solid-like gel was then transferred into a Teflon bottle held in a stainless-steel autoclave for crystallization. The crystallization was carried out in static conditions at 150° C., and time for crystallization was 46 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 91%. SEM micrograph showed that crystalline all-silica zeolite beta obtained had a crystal size of about 1 to 2 µm, and had truncated square bipyramidal morphology.

Example 8

A 75.0 g quantity of colloidal silica (40 wt %, Ludox AS-40), 116.8 g of tetraethylammonium hydroxide (35 wt %, aqueous solution, Aldrich), and adequate amount of water were mixed in a polypropylene beaker under stirring at 45° C. for 24 hours. Thereafter, 9.0 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=3.2$ $F^-/SiO_2=0.67$

This white solid-like gel was then transferred into a Teflon bottle held in a stainless-steel autoclave for crystallization. The crystallization was carried out at 150° C. while stirring at 300 rpm, and time for crystallization was 3 days. The solid product obtained after crystallization was separated from the remaining light brown liquid (the supernatant liquid had a pH of 8 to 9, and the bottom liquid with the solid product had a pH of 4 to 5) by centrifugation, washed several times with distilled water, and dried under vacuum at 120° C. Thereafter, the as-synthesized solid product was calcined in static air at 550° C. for 8 hours. Finally, 28.7 g of all-silica zeolite beta as solid product was obtained, and the yield of all-silica zeolite beta was 95.7%.

Figure 5:
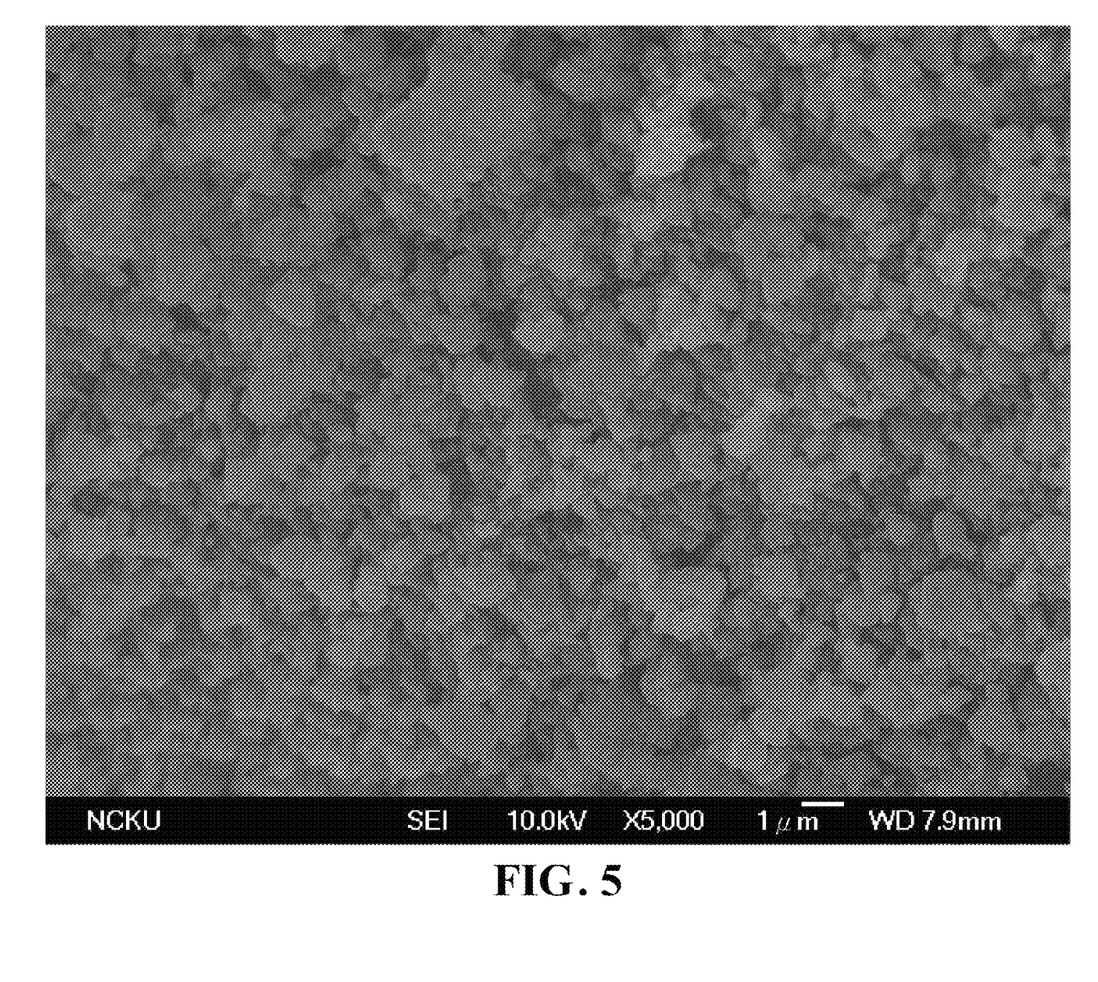
FIG. 5 shows the SEM micrograph of all-silica zeolite beta formed in Example 8.

The solid product once calcined was characterized using XRD and SEM analyses. The crystallinity of all-silica zeolite beta as solid product was determined by X-ray powder diffraction, and it found that the relative crystallinity of all-silica zeolite beta was 84%. SEM micrograph (see FIG. 5) showed that crystalline all-silica zeolite beta obtained had an average crystal size of about 1 µm, had a narrow crystal size distribution, and exhibited irregular crystal morphology.

Example 9

A 30.35 g quantity of fumed silica (Sigma), 119.64 g of tetraethylammonium hydroxide (35 wt %, aqueous solution, Aldrich), and 154 g of deionized water were mixed in a polypropylene beaker under stirring at 50° C. for 24 hours.

Thereafter, 14.8 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=3.8$ $F^-/SiO_2=0.70$

This white solid-like gel was then transferred into a Teflon bottle held in a stainless-steel autoclave for crystallization. The crystallization was carried out at 150° C. while stirring at 300 rpm, and time for crystallization was 3 days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 114%. SEM micrograph showed that crystalline all-silica zeolite beta obtained had an average crystal size of about 1 μm, had a narrow crystal size distribution, and had truncated square bipyramidal morphology.

Example 10

A 30.0 g quantity of fumed silica (Sigma), 115.4 g of tetraethylammonium hydroxide (35 wt %, aqueous solution, Aldrich), and 151 g of deionized water were mixed in a polypropylene beaker under stirring at 50° C. for 24 hours. Thereafter, 15.2 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=3.6$ $F^-/SiO_2=0.73$

This white solid-like gel was then transferred into a Teflon bottle held in a stainless-steel autoclave for crystallization. The crystallization was carried out at 150° C. while stirring at 650 rpm, and time for crystallization was three days. The solid product was filtered, dried, and calcined at 550° C. for 8 hours. Finally, 28.38 g of all-silica zeolite beta as solid product was obtained, and the yield of all-silica zeolite beta was 94.6%.

Figure 6:
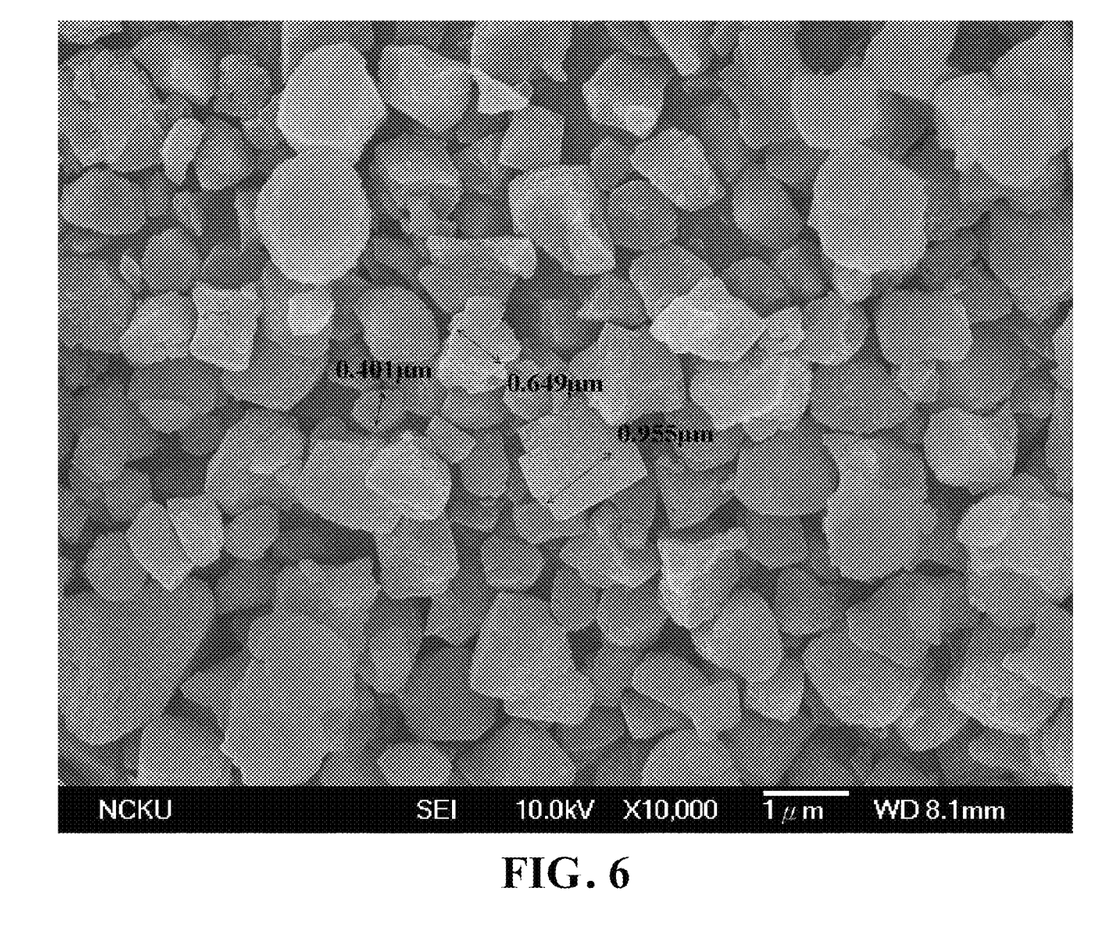
FIG. 6 shows the SEM micrograph of all-silica zeolite beta formed in Example 10.

The solid product once calcined was characterized using XRD and SEM analyses. The crystallinity of all-silica zeolite beta as solid product was determined by X-ray powder diffraction, and it found that the relative crystallinity of all-silica zeolite beta was 136%. SEM micrograph (see FIG. 6) showed that crystalline all-silica zeolite beta obtained had a crystal size of about 0.4 to 1 μm, and exhibited irregular crystal morphology.

Example 11

A 30.1 g quantity of fumed silica (Sigma), 119.6 g of tetraethylammonium hydroxide (35 wt %, aqueous solution, Aldrich), and 150 g of deionized water were mixed in a polypropylene beaker under stirring at 60° C. for 24 hours. Thereafter, 15.7 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.56$ $H_2O/SiO_2=2.99$ $F^-/SiO_2=0.75$

This white solid-like gel was then transferred into a Teflon bottle held in a stainless-steel autoclave for crystallization. The crystallization was carried out at 150° C. while stirring at 300 rpm, and time for crystallization was 3 days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 154%. SEM micrograph showed that crystalline all-silica zeolite beta obtained had a crystal size of about 0.8 to 1.3 μm, and exhibited irregular crystal morphology.

Example 12

A 36.3 g quantity of fumed silica (Sigma), 139.8 g of tetraethylammonium hydroxide (35 wt %, aqueous solution, Aldrich), and 152 g of deionized water were mixed in a polypropylene beaker under stirring at 50° C. for 24 hours. Thereafter, 15.3 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.55$ $H_2O/SiO_2=6.46$ $F^-/SiO_2=0.80$

This white solid-like gel was then transferred into a Teflon bottle held in a stainless-steel autoclave for crystallization. The crystallization was carried out at 150° C. while stirring at 300 rpm, and time for crystallization was 72 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 100%. SEM micrograph showed that crystalline all-silica zeolite beta obtained had a crystal size of about 2 to 5 μm, and exhibited irregular crystal morphology.

Example 13

A 44.1 g quantity of colloidal silica (30 wt %, Ludox AS-30), 32.47 g of tetraethylammonium hydroxide (35 wt %, aqueous solution, Aldrich), and adequate amount of water were mixed in a polypropylene beaker under stirring at 45° C. for 24 hours. Thereafter, 6.2 g of hydrofluoric acid (48 wt %, aqueous solution, Panreac) was dropwise added to the resulting mixture under stirring, which caused the transformation of the mixture into a white solid-like gel. The white solid-like gel had a composition expressed in terms of mole ratios within the ranges as follows:

$SiO_2/Al_2O_3=\infty$ $TEA^+/SiO_2=0.38$ $H_2O/SiO_2=4.8$ $F^-/SiO_2=0.67$

This white solid-like gel was then transferred into a Teflon bottle held in a stainless-steel autoclave for crystallization. The crystallization was carried out in static conditions at 150° C., and time for crystallization was five days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 90%. SEM micrograph showed that crystalline all-silica zeolite beta obtained had an average crystal size of about 20 μm, which indicated that the crystal sizes were not easily reduced when the amounts of tetraethylammonium hydroxide and hydrofluoric acid were decreased without decrease of water content.

The following EXAMPLE 14 to EXAMPLE 19 illustrate the preferred embodiments of the invention, in which the source of silicon dioxide, hydrofluoric acid, and water were first mixed together, and then mixed with tetraethylammonium hydroxide, in the absence of $Al_2O_3$.

Example 14

A 77.59 g quantity of colloidal silica (40 wt %, Ludox AS-40) was added to a polypropylene beaker, and then 17.5 g of hydrofluoric acid (48 wt %, aqueous solution, Panreac) was dropwise added thereto under stirring at room temperature, which led to a white gel formation. Thereafter, 127.7 g of tetraethylammonium hydroxide (35 wt %, aqueous solution, Aldrich) was added to the resulting white gel under stirring, which led to a milk-white solution. Then, the resulting milk-white solution was stirred at 50° C. for 24 hours, which caused the transformation of the solution into a milk-white solid-like gel. The milk-white solid-like gel had a composition expressed in terms of mole ratios within the ranges as follows:

$SiO_2/Al_2O_3=\infty$ $TEA^+/SiO_2=0.58$ $H_2O/SiO_2=4.43$ $F^-/SiO_2=0.81$

This milk-white solid-like gel was then transferred into a Teflon bottle held in a stainless-steel autoclave for crystallization. The crystallization was carried out at 150° C. while stirring at 300 rpm, and time for crystallization was three days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 83%. SEM micrograph showed that crystalline all-silica zeolite beta obtained had a crystal size of about 1 to 3 μm, and exhibited irregular crystal morphology.

Example 15

A 76 g quantity of colloidal silica (40 wt %, Ludox AS-40) was added to a polypropylene beaker, and then 21.86 g of hydrofluoric acid (48 wt %, aqueous solution, Panreac) was dropwise added thereto under stirring at room temperature, which led to a white gel formation. Thereafter, 176.8 g of tetraethylammonium hydroxide (35 wt %, aqueous solution, Aldrich) was added to the resulting white gel under stirring, which led to a milk-white solution. Then, the resulting milk-white solution was stirred at 56° C. for 24 hours, which caused the transformation of the solution into a milk-white solid-like gel. The milk-white solid-like gel had a composition expressed in terms of mole ratios within the ranges as follows:

$SiO_2/Al_2O_3=\infty$ $TEA^+/SiO_2=0.83$ $H_2O/SiO_2=3.47$ $F^-/SiO_2=1.04$

This milk-white solid-like gel was then transferred into a Teflon bottle held in a stainless-steel autoclave for crystallization. The crystallization was carried out at 150° C. while stirring at 300 rpm, and time for crystallization was two and a half days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 78%. SEM micrograph showed that crystalline all-silica zeolite beta obtained had a crystal size of about 0.8 to 1.5 μm, and exhibited irregular crystal morphology Example 16

A 146.6 g quantity of colloidal silica (40 wt %, Ludox AS-40) was added to a polypropylene beaker, and then 35 g of hydrofluoric acid (48 wt %, aqueous solution, Panreac) was dropwise added thereto under stirring at room temperature, which led to a white gel formation. Thereafter, 228.2 g of tetraethylammonium hydroxide (35 wt %, aqueous solution, Aldrich) was added to the resulting white gel under stirring, which led to a milk-white solution. Then, the resulting milk-white solution was stirred at 60° C. for 24 hours, which caused the transformation of the solution into a milk-white solid-like gel. The milk-white solid-like gel had a composition expressed in terms of mole ratios within the ranges as follows:

$SiO_2/Al_2O_3=\infty$ $TEA^+/SiO_2=0.555$ $H_2O/SiO_2=2.59$ $F^-/SiO_2=0.86$

This milk-white solid-like gel was then transferred into a Teflon bottle held in a stainless-steel autoclave for crystallization. The crystallization was carried out at 150° C. while stirring at 300 rpm, and time for crystallization was two days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 86%. SEM micrograph showed that crystalline all-silica zeolite beta obtained had a crystal size of about 0.7 to 1.7 µm, and exhibited irregular crystal morphology.

Example 17

A 130 g quantity of colloidal silica (40 wt %, Ludox AS-40) was added to a polypropylene beaker, and then 20.21 g of hydrofluoric acid (48 wt %, aqueous solution, Panreac) was dropwise added thereto under stirring at room temperature, which led to a white gel formation. Thereafter, 204.6 g of tetraethylammonium hydroxide (35 wt %, aqueous solution, Aldrich) was added to the resulting white gel under stirring, which led to a milk-white solution. Then, the resulting milk-white solution was stirred at 60° C. for 48 hours, which caused the transformation of the solution into a milk-white solid-like gel. The milk-white solid-like gel had a composition expressed in terms of mole ratios within the ranges as follows:

$SiO_2/Al_2O_3=\infty$ $TEA^+/SiO_2=0.56$ $H_2O/SiO_2=3.53$ $F^-/SiO_2=0.56$

This milk-white solid-like gel was then transferred into a Teflon bottle held in a stainless-steel autoclave for crystallization. The crystallization was carried out at 150° C. while stirring at 320 rpm, and time for crystallization was two days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 87%. SEM micrograph showed that crystalline all-silica zeolite beta obtained had a crystal size of about 0.8 to 1.5 µm, and exhibited irregular crystal morphology.

Example 18

A 130.6 g quantity of colloidal silica (40 wt %, Ludox AS-40) was added to a polypropylene beaker, and then 25.48 g of hydrofluoric acid (48 wt %, aqueous solution, Panreac) was dropwise added thereto under stirring at room temperature, which led to a white gel formation. Thereafter, 183.0 g of tetraethylammonium hydroxide (35 wt %, aqueous solution, Aldrich) was added to the resulting white gel under stirring, which led to a milk-white solution. Then, the resulting milk-white solution was stirred at 60° C. for 24 hours, which caused the transformation of the solution into a milk-white solid-like gel. The milk-white solid-like gel had a composition expressed in terms of mole ratios within the ranges as follows:

$SiO_2/Al_2O_3=\infty$ $TEA^+/SiO_2=0.50$ $H_2O/SiO_2=2.77$ $F^-/SiO_2=0.70$

This milk-white solid-like gel was then transferred into a Teflon bottle held in a stainless-steel autoclave for crystallization. The crystallization was carried out at 150° C. while stirring at 350 rpm, and time for crystallization was two days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 92%. SEM micrograph showed that crystalline all-silica zeolite beta obtained had a crystal size of about 1 to 2 µm, and exhibited irregular crystal morphology.

Example 19

A 130.0 g quantity of colloidal silica (40 wt %, Ludox AS-40) was added to a polypropylene beaker, and then 19.95 g of hydrofluoric acid (48 wt %, aqueous solution, Panreac) was dropwise added thereto under stirring at room temperature, which led to a white gel formation. Thereafter, 182.6 g of tetraethylammonium hydroxide (35 wt %, aqueous solution, Aldrich) was added to the resulting white gel under stirring, which led to a milk-white solution. Then, the resulting milk-white solution was stirred at 60° C. for 24 hours, which caused the transformation of the solution into a milk-white solid-like gel. The milk-white solid-like gel had a composition expressed in terms of mole ratios within the ranges as follows:

$SiO_2/Al_2O_3=\infty$ $TEA^+/SiO_2=0.50$ $H_2O/SiO_2=2.08$ $F^-/SiO_2=0.55$

This milk-white solid-like gel was then transferred into a Teflon bottle held in a stainless-steel autoclave for crystallization. The crystallization was carried out at 150° C. while stirring at 350 rpm, and time for crystallization was 2 days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 79%. SEM micrograph showed that crystalline all-silica zeolite beta obtained had crystal size of about 0.2 to 0.8 µm (some were found to be 3 to 7 µm), which indicated that the crystal sizes were not easily reduced when the amounts of tetraethylammonium hydroxide and hydrofluoric acid were decreased without decrease of water content.

The following EXAMPLE 20 to EXAMPLE 22 illustrate the preferred embodiments of the invention, in which the source of silicon dioxide, tetraethylammonium hydroxide, and water are first mixed together, and then mixed with hydrofluoric acid, in the presence of seed.

Example 20

A 40.45 g quantity of colloidal silica (30 wt %, Ludox AS-30), 46.9 g of tetraethylammonium hydroxide (35 wt %, aqueous solution, Aldrich), and adequate amount of water were mixed in a polypropylene beaker under stirring at room temperature for several minutes, followed by adding 2.46 g of zeolite beta with Si/Al ratio of 30 as seed, and heating at 50° C. with stirring for 20 hours. Thereafter, 5.9 g of hydrofluoric acid (48 wt %, aqueous solution, Panreac) was dropwise added to the resulting mixture under stirring, which caused the transformation of the mixture into a very dense gel. The very dense gel had a composition expressed in terms of mole ratios within the ranges as follows:

$TEA^+/SiO_2=0.55$ $H_2O/SiO_2=4.6$ $F^-/SiO_2=0.70$

This very dense gel was then transferred into a Teflon bottle held in a stainless-steel autoclave for crystallization. The crystallization was carried out in static conditions at 140° C., and time for crystallization was 20 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 75%. SEM micrograph showed that crystalline all-silica zeolite beta obtained had an average crystal size of about 0.2 μm, had a narrow crystal size distribution, and had truncated square bipyramidal morphology. The energy-dispersive spectrometer (EDS) measurement showed that there were no detectable levels of aluminum atoms on the surface of all-silica zeolite beta, which indicated that aluminum atoms existed inside of all-silica zeolite beta.

Example 21

A 27.3 g quantity of colloidal silica (30 wt %, Ludox AS-30), 26.55 g of tetraethylammonium hydroxide (35 wt %, aqueous solution, Aldrich), and adequate amount of water were mixed in a polypropylene beaker under stirring at room temperature for several minutes, followed by adding 6.46 g of zeolite beta with Si/Al ratio of 30 as seed, and heating at 40° C. with stirring for 20 hours. Thereafter, 3.4 g of hydrofluoric acid (48 wt %, aqueous solution, Panreac) was dropwise added to the resulting mixture under stirring, which caused the transformation of the mixture into a very dense gel. The very dense gel had a composition expressed in terms of mole ratios within the ranges as follows:

$TEA^+/SiO_2=0.63$ $H_2O/SiO_2=4.8$ $F^-/SiO_2=0.82$

This very dense gel was then transferred into a Teflon bottle held in a stainless-steel autoclave for crystallization. The crystallization was carried out in static conditions at 140° C., and time for crystallization was 20 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 71%. SEM micrograph showed that crystalline all-silica zeolite beta obtained had a crystal size of 0.2 to 0.5 μm, and had truncated square bipyramidal morphology. The EDS measurement showed that there were many aluminum atoms on the surface of all-silica zeolite beta, which indicated that if an excess amount of Al-containing zeolite beta as seed was used, the aluminum atoms would involve in the crystallization process and move outwards.

Example 22

A 30.8 g quantity of colloidal silica (40 wt %, Ludox AS-40), 47.0 g of tetraethylammonium hydroxide (35 wt %, aqueous solution, Aldrich), and adequate amount of water were mixed in a polypropylene beaker under stirring at room temperature for several minutes, followed by adding 6.0 g of zeolite mordenite with Si/Al ratio of 20 (CBV21A), which is commercially available from Zeolyst International, and heating at 40° C. with stirring for 20 hours. Thereafter, 3.4 g of hydrofluoric acid (48 wt %, aqueous solution, Panreac) was dropwise added to the resulting mixture under stirring, which caused the transformation of the mixture into a very dense gel. The very dense gel had a composition expressed in terms of mole ratios within the ranges as follows:

$TEA^+/SiO_2=0.54$ $H_2O/SiO_2=4.8$ $F^-/SiO_2=0.94$

This very dense gel was then transferred into a Teflon bottle held in a stainless-steel autoclave for crystallization. The crystallization was carried out in static conditions at 150° C., and time for crystallization was three days. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 136%. The EDS measurement showed that there were many aluminum atoms on the surface of all-silica zeolite beta.

The following EXAMPLE 23 and EXAMPLE 24 illustrate the preferred embodiments of the invention, in which the source of silicon dioxide, tetraethylammonium hydroxide, and water are first mixed together, and then mixed with hydrofluoric acid, in the presence of metal source.

Example 23

A 90.55 g quantity of colloidal silica (30 wt %, Ludox AS-30), 138.75 g of tetraethylammonium hydroxide (35 wt %, aqueous solution, Aldrich), 1.18 g of tin(II) acetate [Sn(CH$_3$COO)$_2$], and adequate amount of water were homogeneously mixed in a polypropylene beaker and stirred at 45° C. for 24 hours, followed by dropwise adding 25.22 g of hydrofluoric acid (48 wt %, aqueous solution, Panreac) to form a light-brown solid-like gel. The light-brown solid-like gel had a composition expressed in terms of mole ratios within the ranges as follows:

$SiO_2/Al_2O_3=\infty$ $TEA^+/SiO_2 0.546$ $H_2O/SiO_2=3.0$ $F^-/SiO_2=1.0$ $Sn/SiO_2=0.0083$ This light-brown solid-like gel was then transferred into a Teflon bottle held in a stainless-steel autoclave for crystallization. The crystallization was carried out at 150° C. while stirring at 300 rpm, and time for crystallization was 71 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 78%. SEM micrograph showed that crystalline all-silica zeolite beta obtained had an average crystal size of about 1 μm, had a narrow crystal size distribution, and exhibited irregular crystal morphology.

Example 24

A 87.8 g quantity of colloidal silica (40 wt %, Ludox AS-40), 135.6 g of tetraethylammonium hydroxide (35 wt %, aqueous solution, Aldrich), 0.346 g of tin(II) acetate [Sn(CH$_3$COO)$_2$], 0.192 of tetraammineplatinum(II) nitrate [Pt(NH$_3$)$_4$(NO$_3$)$_2$], and adequate amount of water were homogeneously mixed in a polypropylene beaker and stirred at 60° C. for 24 hours, followed by dropwise adding 25.22 g of hydrofluoric acid (48 wt %, aqueous solution, Panreac) to form a light-brown solid-like gel. The light-brown solid-like gel had a composition expressed in terms of mole ratios within the ranges as follows:

$SiO_2/Al_2O_3=\infty$ $TEA^+/SiO_2=0.55$ $H_2O/SiO_2=3.6$ $F^-/SiO_2=0.7$ $Sn/SiO_2=0.0025$ $Pt/SiO_2=0.00085$ This light-brown solid-like gel was then transferred into a Teflon bottle held in a stainless-steel autoclave for crystallization. The crystallization was carried out at 140° C. while stirring at 300 rpm, and time for crystallization was 72 hours. The solid product was filtered, dried, and calcined at 550° C. for 8 hours.

The solid product once calcined was characterized using XRD and SEM analyses. The crystallinity of all-silica zeolite beta as solid product was determined by X-ray powder diffraction, and it found that the relative crystallinity of all-silica zeolite beta was 74%. SEM micrograph showed that crystalline all-silica zeolite beta obtained had an average crystal size of about 2 μm.

As stated above, the present invention has the following advantages:
1. The highly crystalline all-silica zeolite beta can be synthesized within one to four days, as compared to ten or more days by the conventional procedure.
2. The highly crystalline all-silica zeolite beta with an average crystal size of less than 5 μm is successfully synthesized.
3. The highly crystalline all-silica zeolite beta is produced in high yield.
4. The crystalline all-silica zeolite beta produced shows the typical beta zeolite X-ray diffraction spectrum.
5. The highly crystalline all-silica zeolite beta with an average crystal size of less than 5 μm can be produced in large scale for practical application.
6. The crystalline all-silica zeolite beta is used for manufacturing zeolite membranes, or used for manufacturing zeolite beta based catalysts which shows enhanced activity for the hydrogenation of unsaturated or functionalized hydrocarbons, the dehydrogenation of hydrocarbons, the oxidation of hydrocarbons, the mild hydrocracking of hydrocarbons or functionalized hydrocarbons, or the polymerization of olefins.

What is claimed is:

1. A method for synthesizing an all-silica zeolite beta having an average crystal size of less than 5 μm, comprising the following steps:
   forming a reaction mixture comprising a source of silicon dioxide (SiO$_2$), a source of fluoride ions (F$^-$), a source of tetraethylammonium cations (TEA$^+$), and water (H$_2$O), the reaction mixture having a composition expressed in terms of mole ratios in the following ranges:

$F^-/SiO_2=0.33$ to $3.0$ $TEA^+/SiO_2=0.3$ to $1.0$ $H_2O/SiO_2=1.5$ to $6.0$ $F^-/TEA^+=1.1$ to $3.0$ (b) maintaining the reaction mixture under conditions sufficient to form crystals of the all-silica zeolite beta; and
   (c) recovering the crystals of the all-silica zeolite beta,
   wherein the pH of the mixture before crystallization is in the range from 6 to 9, and the pH of the mixture after completion of crystallization is in the range from 6 to 8.

2. The method according to claim 1, wherein in the step (a), the reaction mixture is formed at a temperature of 30 to 90° C.

3. The method according to claim 1, wherein in the step (a), the reaction mixture is formed at a temperature of 40 to 80° C.

4. The method according to claim 1, wherein in the step (a), the reaction mixture has a composition expressed in terms of mole ratios in the following ranges:

$F^-/SiO_2=0.55$ to $3.0$ $TEA^+/SiO_2=0.3$ to $0.5$ $H_2O/SiO_2=1.5$ to $6.0$ $F/TEA^+=1.1$ to $3.0$.

5. The method according to claim 1, wherein in the step (a), the source of silicon dioxide (SiO$_2$), the source of fluoride ions (F$^-$), and water (H$_2$O) are first mixed together at room temperature, and then mixed with the source of tetraethylammonium cations (TEA$^+$) at a temperature of 40 to 80° C. to form the mixture, the mixture has a composition expressed in terms of mole ratios in the following ranges:

$F^-/SiO_2=0.44$ to $1.8$ $TEA^+/SiO_2=0.4$ to $0.9$ $H_2O/SiO_2=1.5$ to $4.0$ $F^-/TEA^+=1.1$ to $2.0$.

6. The method according to claim 1, wherein in the step (a), the source of silicon dioxide (SiO$_2$), the source of tetraethylammonium cations (TEA$^+$), and water (H$_2$O) are first mixed together at a temperature of 40 to 80° C., and then mixed with the source of fluoride ions (F$^{31}$) to form the mixture, the mixture has a composition expressed in terms of mole ratios in the following ranges:

$F^-/SiO_2=0.55$ to $2.0$ $TEA^+/SiO_2=0.5$ to $1.0$ $H_2O/SiO_2$=2.0 to 4.0

$F^-/TEA^+$=1.1 to 2.0.

7. The method according to claim 1, wherein in the step (b), maintaining the reaction mixture under conditions sufficient to form crystals of the all-silica zeolite beta includes stirring at a rate of 0 to 800 rpm and at a temperature ranging from 100 to 190° C.

8. The method according to claim 1, wherein in the step (b), maintaining the reaction mixture under conditions sufficient to form crystals of the all-silica zeolite beta includes stirring at a rate of 300 to 600 rpm and at a temperature ranging from 100 to 190° C.

9. The method according to claim 1, further comprising the step of calcining the crystals of all-silica zeolite beta after the step (c).

10. The method according to claim 9, the all-silica zeolite beta is calcined in air at 350 to 900° C.

11. The method according to claim 10, wherein, when the all-silica zeolite beta after calcination is soaked in neutral water, the water becomes acidic with a pH value of less than 4.0.

12. The method according to claim 1, wherein the source of silicon dioxide ($SiO_2$) is selected from the group consisting of tetraalkyl orthosilicates, colloidal silica, fumed silica, silicic acid, and amorphous silica.

13. The method according to claim 1, wherein a promoter is added to the reaction mixture of step (a).

14. The method according to claim 13, wherein the promoter is selected from the group consisting of zeolite beta, zeolite mordenite, and metal salt.

* * * * *